E. HÖNIG.
OPTICAL SIGN.
APPLICATION FILED OCT. 17, 1914.

1,349,277.

Patented Aug. 10, 1920.

Witnesses:
Edward von Bodecker
Carl Hadwik

Inventor:
Edgar Hönig

UNITED STATES PATENT OFFICE.

EDGAR HÖNIG, OF WILMERSDORF-BERLIN, GERMANY, ASSIGNOR TO THE FIRM OPTISCHE SIGNALE GESELLSCHAFT MIT BESCHRÄNKTER HAFTUNG, OF BERLIN, GERMANY.

OPTICAL SIGN.

1,349,277.  Specification of Letters Patent.  Patented Aug. 10, 1920.

Application filed October 17, 1914. Serial No. 867,244.

*To all whom it may concern:*

Be it known that I, EDGAR HÖNIG, residing at No. 16 Hantenerstrasse, Wilmersdorf-Berlin, Germany, have invented certain new and useful Improvements in Optical Signs, of which the following is a specification.

My invention relates to an improved optical sign principally destined for the use of pilots of aeroplanes and for aeronauts in general, navigators and similar purposes. The object of this invention consists in affording to the pilot or sailor simple and positive means of orientation while floating in the atmosphere, or at sea while approaching a harbor. The signal of my invention, however, not only serves to indicate the known place where it has been erected, a performance generally known to be obtained by a beacon or light-house or other optical sign of a known kind, but it is especially destined to enable the pilot or sailor (hereinafter termed the observer) to determine the distance and the altitude of the position occupied by him in space.

The new system of my improved optical sign consists in offering to the eye of the observer not a single object to rest upon, as does a beacon, light-house or other optical sign, but to provide a double or multiple object of observation, the said two or multiple objects being arranged in a distinct order with relation to each other, the dimensions of the said objects and their reciprocal order of position being well known to those who wish to profit and make use of the said signal.

In carrying my invention into practice, I prefer to erect two, or in some cases three or even more signals of a regular shape, such for instance, as geometrical figures, circles, squares, triangles, polygons and the like, the two or more signs or signals of a set being, preferably, of different size and color and placed in a distinct local relation to each other, such for instance, as concentrically in the same plane inside each other, or co-axially above or behind each other, the difference in size of the two or several signs being so calculated, that even from the remotest distance the separate figures may be clearly distinguished from each other. Different colors of the two or several figures may be employed to facilitate the perception of the difference between the said figures of a set.

It will be understood, that the observer, on perceiving from any distant position, the two or more signals placed at an elevated station in a predetermined local arrangement with relation to each other, will be able to perceive at a glance, whether the position momentarily occupied by him in space is in face of and at the same level with the signal figures.

A pilot or sailor finding himself opposite a light-house or other single optical sign, has only one line of sight to calculate his actual position with relation to the station occupied by said sign; the single line does not enable him to determine either his exact angular position to, or his elevation above, or his distance from the sign. The use of a set of two or several signs erected in a known determined order with relation to each other gives the means to at any moment decide not only the angular position but also the altitude and distance of the observer with relation to the said signs.

To make my invention properly understood, I have illustrated the same in accompanying drawings, in which—

Figure 1:
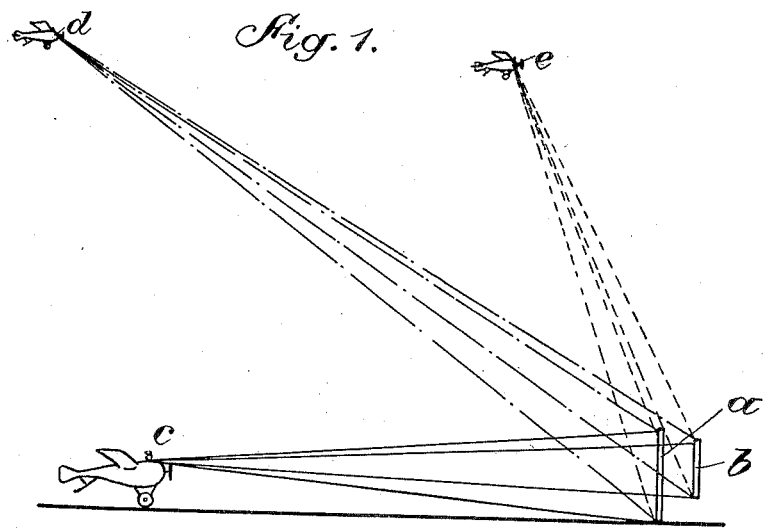
Figure 1 is a diagrammatical side-elevation of a set of two optical signs, in apposition to varying positions of the observer, supposing the same to be carried by an aeroplane.
Figure 5:
Figure 6:
Figure 7:
Figure 8:
Figure 9:
Figure 10:
Figure 11:
Figure 12:
Figure 13:

Referring to Fig. 1, $a$, and $b$, designate two optical signs of different size, the said signs, seen in side-elevation. I prefer to employ signs of a regular geometrical figure, such as circles, as shown in Fig. 2, or squares, as shown in Fig. 5, or triangles, as shown in Fig. 8, or hexagons, as shown in Fig. 11.

The outlines of said geometrical figures $a$, and $b$, two of which in general, will be found sufficient to form a set, may conveniently be formed as a frame of circular or angular shape, colored in a manner to be distinguished from a distance.

Figure 2:
Figs. 2 to 13 illustrate various kinds of signs as viewed from different points.

Supposing that the observer takes the position indicated by $c$ in Fig. 1, in face and at the level of the two circles $a$ and $b$, which are placed behind each other at a predetermined known distance, the said circles $a$ and $b$, apparently, will be seen as two concentrical circles, as shown in Fig. 2. Any deviation of the observer from the axis of the two circles will shift the inner circle to the right or left of the outer circle in the eye of the observer. Any change of elevation of the position of the observer will shift the inner circle within the outer circle in the vertical direction and, besides, will change the shape of the circle into that of an ellipse in the eye of the spectator.

Figure 3:

$d$ indicates another supposed position of the observer at a certain altitude above the axial line of the two circles $a$ and $b$, and at a deviation of the right side of said axial line; apparently, the two circles will be seen as ellipses, displaced and cutting each other as shown in Fig. 3, the amount of displacement being proportionate to the angle of deviation from the axis of the signs $a$, $b$.

Figure 4:

A third position $e$ of the observer has been shown in Fig. 1, the position being supposed to be in about a vertical plane above the axis of the two signs $a$, $b$, and at a small distance in advance of the said signs. The signs, from this position, will be seen as shown in Fig. 4, the two ellipses appearing separated and behind each other.

From any position of the observer trigonometrical lines may be sighted to the top- and foot-ends of the signs $a$, and $b$, and as the size of the two signs and their distance from each other are constant and known, it is a matter of trigonometrical calculation to determine the actual position of the observer at any moment, suitable tables prepared in advance enabling the observer to read almost instantaneously the altitude, distance and regular position with relation to the stationary optical signs. A complete orientation is thereby obtained.

I claim as my invention:

An optical sign comprising a set of stationary signs, each sign representing an open-worked regular geometrical figure of a predetermined size, the said signs being erected behind each other in a permanent predetermined position with relation to each other.

In testimony whereof I affix my signature in presence of two witnesses.

EDGAR HÖNIG.

Witnesses:
  Woldemar Haupt,
  Henry Hasper.